March 17, 1925. 1,530,304
I. E. COX
SYNCHRONIZING DEVICE
Filed April 24, 1923
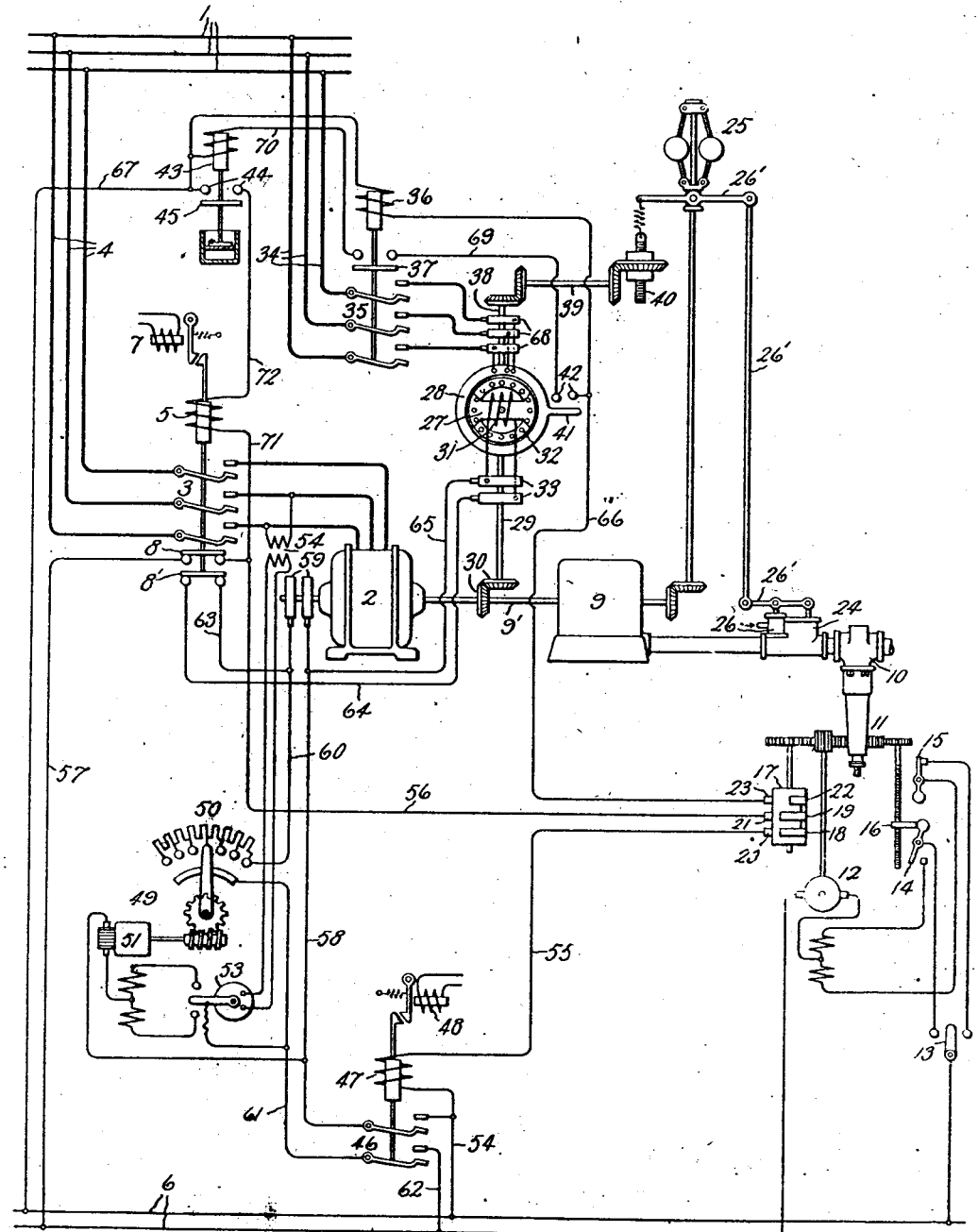
Inventor:
Isaac E. Cox,
by Alexander S. [Lint?]
His Attorney Patented Mar. 17, 1925.

1,530,304

UNITED STATES PATENT OFFICE.

ISAAC E. COX, OF ST. LOUIS, MISSOURI.

SYNCHRONIZING DEVICE.

Application filed April 24, 1923. Serial No. 634,390.

*To all whom it may concern:*

Be it known that I, ISAAC E. Cox, a citizen of the United States, residing at the city of St. Louis, in the State of Missouri, have invented certain new and useful Improvements in Synchronizing Devices, of which the following is a specification.

My invention relates to improvements in synchronizing devices and has for an object to provide an improved synchronizing device which is operative to compare the frequencies of two alternating electromotive forces and thereby automatically to control the source of one electromotive force so as to bring the frequency thereof to its synchronous value relatively to the other electromotive force with a positive and definite action which is dependent upon the difference between the frequencies of the electromotive forces. Another object of my invention is to provide an improved synchronizing device for automatically controlling the operation of connecting one source of alternating electromotive force to another source of alternating electromotive force so that the connection can be effected only when the electromotive forces have substantially the same frequency and are substantially in phase.

This application is a continuation in part of my copending application Serial No. 499,970, filed September 12, 1921, for synchronizing device, certain of the subject matter in said prior application being incorporated in this application together with certain additional subject matter.

My invention will be better understood from the following description taken in connection with the accompanying drawing and its scope will be pointed out in the appended claims.

In the single figure of the accompanying drawing, I have illustrated an embodiment of my invention as applied to a three phase alternating current electric system, comprising an alternating current electric circuit such as a bus 1 to which may be connected a plurality of dynamo electric machines or sources of alternating electromotive force in parallel as is well known to the art. I have illustrated only one dynamo electric machine such as a sychronous generator or alternator 2 having a rotating field and adapted to be connected in circuit with the bus 1 by any suitable circuit controlling means 3 arranged to control a circuit 4 between the bus 1 and the alternator 2. For closing purposes, the circuit controlling means 3 preferably comprises an electroresponsive actuating means such as a closing coil 5 arranged to be energized from a control bus 6. The circuit controlling means 3 is illustrated as an electric switch or circuit breaker of the latched closed type arranged to be released by any suitable electroresponsive tripping means 7 in a maner well known to the art. The switch 3 may also include auxiliary switches 8 and 8' arranged to be controlled thereby so as to be closed when the switch 3 is open and open when the switch 3 is closed.

The alternator 2 may be driven by any suitable driving means herein illustrated as a prime mover 9 of the turbine type direct connected to the rotating field of the alternator 2 by a shaft 9'. For starting and stopping purposes, the prime mover 9 comprises an admission or gate valve 10 arranged to be actuated by any suitable means such as a driving mechanism 11 arranged to be operated by a split field motor 12 which is adapted to be connected to the control bus 6 by a switch 13. For interrupting the circuit of the motor 12 when the desired valve open or closed position is effected, limit switches 14 and 15, controlled by a traveler 16 which is associated with the driving mechanism 11, are provided. The prime mover starting control mechanism also includes suitable switching means such as a drum controller 17 arranged to be operated by the motor 12 through the driving mechanism 11 to control certain electric circuits at predetermined speeds of the prime mover 9, as will hereinafter appear. The drum controller 17 comprises conductively connected segments 18 and 19 arranged to be engaged by contacts 20 and 21 respectively after a predetermined opening movement of the valve 10, and a segment 22 conductively connected to segment 19 and arranged to be engaged by contact 23 after further movement of the valve 10 to the open position.

For controlling the speed of the prime mover 9 and therefore the frequency of the alternator 2, suitable speed control means may be provided, such as a throttling or speed control valve 24 which may be operated directly by suitable speed responsive means such as a centrifugal mechanism 25 arranged to be driven by the prime mover 9, or indirectly through a pilot valve 26 arranged to be controlled by the speed responsive means 25, the effect of which may be transmitted to the valve 26 through links 26'.

For controlling the speed of the alternator 2 so as to bring the electromotive force thereof to its synchronous value relatively to the electromotive force of the bus 1, I provide, in accordance with my invention, means such as a dynamo electric machine comprising two cooperating movable members 27 and 28 operative with a positive and definite action to compare the frequencies of the electromotive forces and to produce a corrective effect dependent upon the difference between the frequencies. The member 27 is arranged to be driven from the shaft 9' for example, at a speed proportional to the frequency of the electromotive force of the alternator 2 and, for this purpose, may be mounted on a shaft 29 in driving relationship with shaft 9' through suitable gears 30. The member 27 may be constructed like the rotor of a rotating field synchronous motor or like the rotor of an induction motor. For example, the member 27 may comprise a magnetic member arranged to be energized by a winding 31 so as to provide at least two fixed poles of opposite polarity, and in addition a short-circuited squirrel cage or amortisseur winding 32, or merely the winding 32 alone. The preferred construction embodies both windings in order to secure the best torque conditions and thereby a positive and definite action on a relatively small difference between the frequencies. The winding 31 may be energized from the control bus 6 through collector rings 33. The cooperating member 28 is constructed like the stator of a synchronous or induction motor and has a winding of the usual polyphase type arranged to be connected in circuit with the bus 1 either directly through conductors 34 or through potential transformers, according to the bus voltage, by any suitable switching means such as a contactor 35. For closing purposes, this contactor is arranged to be operated by a closing coil 36, and the contactor 35 preferably controls an auxiliary switch 37 which is open when the contactor is open and closed when the contactor is closed for a purpose hereinafter set forth.

The cooperating member 28 is secured to a rotatably mounted shaft 38 rotation of which is effective to control the prime mover speed control means so as to provide a corrective effect or speed adjustment supplementary to the control exerted by the centrifugal mechanism and thereby to bring the frequency of the alternator 2 to its synchronous value. This corrective effect may be applied to the pilot valve 26 and thus to the speed control valve 24 by any suitable means such as a jack-shaft 39, arranged to actuate an adjusting member 40 associated with the centrifugal mechanism 25 and the links 26'. Movement of the member 40 in either direction superimposes on the action of the centrifugal mechanism 25 an additional action to effect a change in the speed of the prime mover. This action will be dependent upon the speed of the member 28, which is in turn dependent upon the difference between the frequencies of the alternator and bus voltages, for the member 28 will rotate at a speed corresponding to this difference between the frequencies.

In order that the switch 3 may be closed when the electromotive forces of the alternator 2 and the bus 1 have the same frequency and are in phase, the member 28 comprises a suitable contact member 41, arranged to engage and move over contacts 42 and thereby to effect the energization of a relay 43 which is arranged to control, preferably with a time delay, the circuit of the closing coil 5 of the switch 3 through contacts 44 and contact controlling member 45. The contacts 42 are so disposed relatively to the angular position of member 28 that engagement of the contacts 42 by the contact member 41 occurs substantially when the electromotive forces are in phase and lasts for a time which increases as the difference between the frequencies, that is to say, the speed of the member 28, decreases.

The winding 31 of the rotor member 27 and the field of the alternator 2 may be energized from the control bus 6 or a separate exciter bus if desired. For connecting the alternator field and the winding 31 to the control bus 6, I provide suitable means such as a field switch 46 arranged to be controlled by the prime mover starting means so as to effect the energization of the alternator field and the winding 31 at a predetermined speed of the prime mover. For closing, the switch 46 is arranged to be actuated by suitable means such as a closing coil 47 and the switch 46 may be of the latched closed type arranged to be released by any suitable electroresponsive means 48 in a manner well known to the art.

In order that the electromotive force of the alternator 2 may be the same as the electromotive force of the bus 1, when the electromotive forces thereof have the same frequency and are in phase, any suitable voltage regulating means may be employed. The voltage regulating means may be of the type operative in response to the relative values of the electromotive forces, or with substantially constant bus voltage, of the type operative in response to the electromotive force of the alternator only, as is well known to the art. The voltage regulating means 49 illustrated, is of the latter type and is arranged to control the field excitation of the alternator 2. The voltage regulator 49 comprises a field rheostat 50 arranged to be actuated by a split field motor 51 which is adapted to be energized from the control bus 6 when the field switch 46 is closed, by any suitable means such as a contact making voltmeter 53 operative in response to the electromotive force of the alternator 2. For this purpose, the contact making voltmeter 53 may be connected in shunt relation with the alternator 2 through a potential transformer 54. With this arrangement, the contact making voltmeter 53 controls the motor 51 which operates the rheostat 50 so as to maintain a substantially constant voltage on the alternator 2.

Assuming the parts in position as shown in the drawing and that the alternator 2 is to be connected to the bus 1 in parallel with another source of alternating electromotive force, the operation of the illustrated embodiment of my invention is as follows: Switch 13 is moved to the right thereby connecting the motor 12 to the control bus 6 through a circuit including the limit switch 15 and the lower portion of the split field winding of the motor 12. This energizes the motor 12 so as to rotate in a direction to actuate the driving mechanism 11 and move the starting control valve 10 to open position thereby admitting the energizing agency such as steam or water to the prime mover 9. During the opening movement of the valve 10, the traveler 16 is raised and releases the limit switch 14 which returns to the closed position so that the motor 12 may be energized to close the valve 10 when it is desired to stop the prime mover 9. When the traveler 16 reaches a position corresponding to a predetermined valve opening, it opens the limit switch 15 thereby interrupting the motor circuit and deenergizing the motor 12 so as to prevent jamming the valve mechanism.

Actuation of the driving mechanism 11 effects movement of the drum controller 17 in a direction such that, upon a predetermined valve opening, that is to say a predetermined speed of the prime mover 9, segments 18 and 19 of the drum controller engage the contacts 20 and 21. When this occurs, the closing coil 47 of the field switch 46 is connected to the control bus 6 in a circuit, comprising conductor 54, closing coil 47, conductor 55, contact 20, controller segments 18 and 19, contact 21, conductor 56, auxiliary switch 8 and conductor 57. Upon energization of the coil 47, field switch 46 closes thereby connecting the rotating field of the alternator 2 to the control bus 6 in a circuit, comprising conductor 54, field switch 46, conductor 58, alternator field collector rings 59, conductor 60, rheostat 50, conductor 61, field switch 46 and conductor 62. The predetermined speed of the prime mover at which field switch 46 is closed may be in general any speed below synchronous speed, but with a steam turbine as prime mover, the field switch 46 is preferably not closed until the turbine has attained substantially its critical speed. When the field switch 46 is closed, the winding 31 of the rotating member 27 is also energized, the winding 31 being in a circuit across conductors 58 and 60. This circuit is conductor 63, auxiliary switch 8', conductor 64, collector rings 33 and conductor 65. The member 27 thus constitutes a rotating electromagnetic field which is driven at a speed proportional to the frequency of the alternator electromotive force.

Upon a further predetermined opening of the valve 10, that is to say preferably a greater predetermined speed of the prime mover 9, which may be in the neighborhood of synchronous speed, controller segment 22 engages contact 23. When this occurs, the closing coil 36 of the contactor 35 is connected to the bus 6 in a circuit, comprising conductor 57, auxiliary switch 8, conductor 56, contact 21, controller segments 19 and 22, contact 23, conductor 66, closing coil 36 and conductor 67. Upon the closing of the contactor 35, the energizing winding of the rotatable member 28 is connected to the bus 1 through collector rings 68 and there is set up a field which rotates relatively to the member 28 at a speed dependent upon the frequency of the bus voltage. The interaction of this field and the field of the member 27 results in rotation of the member 28 at a speed proportional to the difference between the frequencies of the alternator and bus voltages. With the squirrel cage winding 32 alone, the member 28 will cooperate with the member 27 in a manner similar to an induction motor and with the squirrel cage winding 32 in addition to the winding 31, an increased starting torque is assured to drive the member 28.

The direction in which the member 28 is caused to rotate will depend upon whether the frequency of the alternator voltage is greater or less than that of the bus voltage. As the member 28 rotates, it will, through the jack shaft 39, the adjusting member 40 and links 26', produce a corrective effect which is superimposed on the action of the centrifugal mechanism 25 to vary the speed of the prime mover 9. This corrective effect being proportional to the difference between the frequencies of the electromotive forces to be synchronized, changes the speed of the prime mover 9 so as to eliminate the difference between the frequencies, that is to say to bring the alternator 2 to synchronous speed.

As the member 28 rotates, the contact member 41 carried thereby will engage contacts 42 for a time dependent upon the speed of the member 28, that is to say, the difference between the frequencies of the alternator and bus voltages. When contacts 42 are engaged by switch member 41, the energizing winding of the relay 43 is connected to the bus 6 in a circuit, comprising conductor 57, auxiliary switch 8, conductor 56, contact 21, controller segments 19 and 22, contact 23, conductor 66, contacts 42 and contact member 41, conductor 69, auxiliary switch 37, conductor 70, energizing winding of relay 43 and conductor 67. As the difference between the frequencies decreases, the contact member 41 will engage contacts 42 a longer time, which is, when the frequencies are substantially the same, sufficient to permit the relay to move contact controlling member 45 to engage contacts 44. When this occurs, the closing coil 5 of the switch 3 is connected to the bus 6 in a circuit, comprising conductor 57, auxiliary switch 8, conductor 71, closing coil 5, conductor 72, contact controlling member 45, contacts 44 and conductor 67. Upon the energization of the closing coil 5, the switch 3 is closed and the alternator 2 connected to the bus 1.

When the switch 3 is closed and latched, auxiliary switches 8 and 8' are opened thereby disconnecting the closing coil 5, the closing coil 36, the relay 43, and the winding 31 of member 27 from the bus 6. Upon deenergization of closing coil 36, the contactor 35 opens thereby opening auxiliary switch 37 so that in the event that contact member 41 should be in engagement with contacts 42 when starting, it will be impossible to energize the relay 43 and connect the alternator 2 to the bus 1. In other words, at starting when the difference between the frequencies is great, it is impossible to energize the relay 43 until the member 28 has been energized so as to rotate and move contact member 41.

To stop the prime mover 9, the switch 3 is tripped open and the switch 13 is moved to the left, thereby connecting the motor 12 to the control bus 6 through a circuit including the limit switch 14 and the upper portion of the split field winding of the motor 12. This energizes the motor 12 to rotate in a direction to actuate the driving mechanism 11 and move the starting control valve 10 to closed position. During the closing movement, the traveler 16 releases the limit switch 15 so that it may close and opens the limit switch 14 so as to deenergize the motor 12 when the valve 10 reaches closed position, and the parts are again in position for starting the prime mover, as shown in the drawing.

While I have herein shown and described one embodiment of my invention, I do not desire to be limited to the exact arrangement shown and described, but seek to cover in the appended claims all modifications which come within the true spirit and scope of my invention.

What I claim as new and desire to secure by Letters Patent of the United States, is:—

1. In an electric system wherein two sources of alternating electromotive force are to be synchronized and wherein means is provided for driving one of said sources, a member arranged to be driven at a speed proportional to the frequency of the source associated with said driving means, means arranged to rotate at a speed dependent upon the difference between the frequencies of the electromotive forces and comprising electromagnetic means associated with said member and arranged to be energized by the other source, and means for controlling the speed of said driving means arranged to be controlled by said electromagnetic means to bring said driving means to synchronous speed.

2. In an electric system wherein two sources of alternating electromotive force are to be synchronized and wherein means is provided for driving one of said sources, synchronizing means comprising a dynamo electric machine having a movable member arranged to be driven at a speed proportional to the frequency of the source associated with said driving means, means arranged to rotate at a speed dependent upon the difference between the frequencies of the electromotive forces comprising a movable electromagnetic member having a winding arranged to be energized by the other source, and means for controlling the speed of said driving means arranged to be controlled by said electromagnetic member to bring said driving means to synchronous speed.

3. In an electric system wherein two sources of alternating electromotive force are to be synchronized and wherein means is provided for driving one of said sources, synchronizing means comprising a switch for connecting said sources together, a member having a winding arranged to be energized upon a predetermined speed of said driving means, said member being arranged to be driven at a speed proportional to the frequency of the source associated with said driving means, a cooperating member having a winding arranged to be connected in circuit with the other source and to rotate at a speed dependent upon the difference between the frequencies of the electromotive forces, and means for closing said switch only when the speed of said cooperating member is less than a predetermined value.

4. In an electric system wherein two sources of alternating electromotive force are to be synchronized and wherein means is provided for driving one of said sources, synchronizing means comprising a switch for connecting said sources together, a member arranged to be driven at a speed proportional to the frequency of the source associated with said driving means, means movable at a speed dependent upon the difference between the frequencies of the electromotive forces comprising a movable electromagnetic member having a winding arranged to be connected in circuit with the other source, and means operative to effect the closing of said switch only after said winding has been energized and the speed of said movable means is less than a predetermined value.

5. In an electric system wherein two sources of alternating electromotive force are to be synchronized and wherein means is provided for driving one of said sources, synchronizing means comprising a dynamo electric machine having a movable member arranged to be driven at a speed proportional to the frequency of the source associated with said driving means and means arranged to rotate at a speed dependent upon the difference between the frequencies of the electromotive forces comprising a cooperating movable member having a winding adapted to be energized by the other of said sources, means for controlling the speed of said driving means arranged to be controlled by said cooperating member, and means controlled by said cooperating member for connecting said sources together when the electromotive forces thereof are in synchronism.

6. In an electric system wherein two sources of alternating electromotive force are to be synchronized and wherein means is provided for driving one of said sources, synchronizing means comprising a dynamo electric machine having a movable member arranged to be driven at a speed proportional to the frequency of one source and means arranged to rotate at a speed dependent upon the difference between the frequencies of the electromotive forces comprising a cooperating movable member having a winding adapted to be connected to the other source, means operative in response to a predetermined speed of said driving means to connect said winding to said other source, means for controlling the speed of said driving means arranged to be controlled by said cooperating member, and means controlled by said cooperating member for connecting said sources together when the electromotive forces thereof are in synchronism.

7. In an electric system wherein two sources of alternating electromotive force are to be synchronized and wherein means is provided for driving one of said sources, synchronizing means comprising a member arranged to be driven at a speed proportional to the frequency of the electromotive force of one source, means arranged to rotate at a speed proportional to the difference between the frequencies of the electromotive forces comprising a cooperating member provided with a winding adapted to be energized by the other source, means for controlling the speed of said driving means arranged to be controlled by said cooperating member to bring said driving means to synchronous speed, and means controlled by said cooperating member for connecting said sources together when the electromotive forces thereof are in synchronism.

8. In an electric system wherein two sources of alternating electromotive force are to be synchronized and wherein means is provided for driving one of said sources, synchronizing means comprising a dynamo electric machine having a movable member provided with a short-circuited winding and arranged to be driven at a speed proportional to the frequency of one source and means arranged to rotate at a speed dependent upon the difference between the frequencies of the electromotive forces comprising a cooperating movable member having a winding adapted to be connected to the other source, means for controlling the speed of said driving means arranged to be controlled by said cooperating member, and means controlled by said cooperating member for connecting said sources together when the electromotive forces thereof are in synchronism.

9. In an electric system wherein two sources of alternating electromotive force are to be synchronized and wherein means is provided for driving one of the sources, synchronizing means comprising a switch for connecting the sources together, a member arranged to be driven at a speed proportional to the frequency of the source associated with said driving means, means arranged to rotate at a speed dependent upon the difference between the frequencies of the electromotive forces comprising a cooperating member having a winding adapted to be connected in circuit with the other source, means adapted to be operated to start said driving means, switching means for connecting said winding to said other source arranged to be controlled by said starting means, and means for closing said switch operative subsequently to the closing of said switching means when the difference between the frequencies of the electromotive forces is less than a predetermined value.

10. In an electric system wherein two sources of alternating electromotive force are to be synchronized and wherein means is provided for driving one of said sources, synchronizing means comprising a member arranged to provide magnetic poles of a fixed polarity and to be driven at a speed proportional to the frequency of the electromotive force of the source associated with said driving means, a cooperating member having a winding arranged to be connected to the other of said sources and to rotate at a speed dependent upon the difference between the frequencies of the electromotive forces, means for controlling the speed of said driving means arranged to be controlled by said cooperating member to bring said driving means to synchronous speed, and means controlled by said cooperating member for connecting said sources together when the electromotive forces thereof are in synchronism.

11. In an electric system wherein two sources of alternating electromotive force are to be synchronized and wherein means is provided for driving one of said sources, synchronizing means comprising a member having an energizing winding and arranged to be driven at a speed proportional to the frequency of the source associated with said driving means, a cooperating member having an energizing winding adapted to be energized by the other source, said cooperating member being arranged to rotate at a speed proportional to the difference between the frequencies of the electromotive forces, means adapted to be operated to start said driving means and arranged to effect energization of said windings, means for controlling the speed of said driving means arranged to be controlled by said cooperating member to bring said driving means to synchronous speed, and means controlled by said cooperating member for connecting said sources together when said driving means has attained synchronous speed.

12. In an electric system wherein two sources of alternating electromotive force are to be synchronized and wherein means is provided for driving one of said sources, synchronizing means comprising an electromagnetic member arranged to provide poles of a fixed polarity and to be driven at a speed proportional to the frequency of the source associated with said driving means, means for controlling the starting of said driving means arranged to effect the energization of said member, a cooperating electromagnetic member having an energizing winding arranged to be connected to the other source at a predetermined speed of said driving means, said cooperating electromagnetic member being arranged to rotate at a speed proportional to the difference between the frequencies of the electromotive forces, means controlled by said cooperating electromagnetic member operative to control the speed of said driving means whereby to bring the same to synchronous speed, and means controlled by said cooperating electromagnetic member for connecting said sources together when said driving means has attained synchronous speed.

13. In an electric system wherein the electromotive force of an alternator is to be synchronized with the electromotive force of an electric circuit and wherein a prime mover is provided for driving said alternator, a switch for connecting said alternator to said circuit, a dynamo electric machine comprising a rotor arranged to be driven by said prime mover at a speed proportional to the frequency of the alternator and having a winding arranged to be energized at a predetermined speed of the prime mover and a member movable relatively to said rotor comprising an energizing winding arranged to be connected to said electric circuit at a higher predetermined speed of the prime mover, said member being arranged to rotate at a speed dependent upon the difference between the frequencies of the alternator and the circuit, and means operative with a time delay to effect the closing of said switch only when the speed of said member is less than a predetermined value.

14. In an electric system wherein the electromotive force of an alternator is to be synchronized with the electromotive force of an electric circuit and wherein a prime mover is provided for driving said alternator, a switch for connecting the alternator to the circuit, a member arranged to be driven by said prime mover at a speed proportional to the frequency of the electromotive force of the alternator, a relatively movable cooperating member having an energizing winding and arranged to rotate at a speed proportional to the difference between the frequencies of the electromotive forces of said alternator and said circuit, means adapted to be operated to start said prime mover comprising switching means arranged to connect said winding to the electric circuit at a predetermined speed of the prime mover, means controlled by said cooperating member operative in response to the rotation thereof to change the speed of the prime mover whereby to bring the same to synchronous speed, and means comprising a time limit relay operative to effect the closing of said switch only when the speed of said cooperating member is less than a predetermined value.

15. In an electric system wherein the electromotive force of an alternator is to be synchronized with the electromotive force of an electric circuit and wherein a prime mover is provided for driving said alternator, a switch for connecting said alternator to said circuit, an electromagnetic element arranged to be driven by said prime mover at a speed proportional to the frequency of the electromotive force of the alternator, means adapted to be operated to start the prime mover and arranged at a predetermined speed thereof to effect the energization of said electromagnetic element, means for controlling the speed of the prime mover, a member arranged to cooperate with said electromagnetic element and having an energizing winding arranged to be connected to said electric circuit at a higher predetermined speed of the prime mover, said member being arranged to rotate at a speed dependent upon the difference between the frequencies of the alternator and the circuit, means operative by said member to control said speed control means whereby to bring the prime mover to synchronous speed, and means operative with a time delay to effect the closing of said switch only when the speed of said member is less than a predetermined value.

16. In an electric system wherein the electromotive force of an alternator is to be synchronized with the electromotive force of an alternating electric current circuit and wherein a prime mover is provided for driving said alternator, a dynamoelectric machine comprising two relatively movable cooperating members, one of said members being arranged to be driven at a speed dependent upon the frequency of said alternator and the other of said members being arranged to rotate at a speed dependent upon the difference between the frequencies of said circuit and said alternator, and means for controlling the speed of said prime mover arranged to be controlled by said other member to bring said prime mover to synchronous speed.

In witness whereof, I have hereunto set my hand this 21 day of April, 1923.

ISAAC E. COX.